US011106525B2

(12) United States Patent
Li et al.

(10) Patent No.: US 11,106,525 B2
(45) Date of Patent: Aug. 31, 2021

(54) SYSTEMS AND METHODS FOR CLASSIFYING AND PREDICTING THE CAUSE OF INFORMATION TECHNOLOGY INCIDENTS USING MACHINE LEARNING

(71) Applicant: ServiceNow, Inc., Santa Clara, CA (US)

(72) Inventors: Lingzhu Li, Mountain View, CA (US); Abhay Narayan Kulkarni, Pleasanton, CA (US); Matthew David Lloyd, Santa Clara, CA (US)

(73) Assignee: ServiceNow, Inc., Santa Clara, CA (US)

( * ) Notice: Subject to any disclaimer, the term of this patent is extended or adjusted under 35 U.S.C. 154(b) by 248 days.

(21) Appl. No.: 16/267,114

(22) Filed: Feb. 4, 2019

(65) Prior Publication Data
US 2020/0250022 A1 Aug. 6, 2020

(51) Int. Cl.
*G06F 11/07* (2006.01)
*G06F 17/18* (2006.01)
(Continued)

(52) U.S. Cl.
CPC ........ *G06F 11/079* (2013.01); *G06F 11/3409* (2013.01); *G06F 17/18* (2013.01); *G06K 9/6282* (2013.01)

(58) Field of Classification Search
CPC .... G06F 11/079; G06F 11/3409; G06F 17/18; G06K 9/6282
See application file for complete search history.

(56) References Cited

U.S. PATENT DOCUMENTS 5,848,243 A 12/1998 Kulkarni et al.
6,321,229 B1 11/2001 Goldman
(Continued)

FOREIGN PATENT DOCUMENTS

CA 3003779 A1 11/2018
EP 3399432 A1 11/2018
(Continued)

OTHER PUBLICATIONS

Anyanwu, Matthew N. et al., "Comparative Analysis of Serial Decision Tree Classification Algorithms",Jun. 30, 2009, International Journal of Computer Science and Security (IJCSS), vol. 3, Issue 3, pp. 230-240 (Year: 2009).*
(Continued)

*Primary Examiner* — Matthew M Kim
*Assistant Examiner* — Indranil Chowdhury
(74) *Attorney, Agent, or Firm* — Fletcher Yoder PC

(57) ABSTRACT

The present disclosure provides systems and methods for classifying incidents based on determining an odds ratio that represents a likelihood of an incident being related to the problem, classifying incidents based on determining a decision tree that forms branches based on whether a feature is present in the incident, and predicting whether a new incident is related to a problem. Features may be extracted from a set of incidents (e.g., that are reported over a certain time period) that include incidents related to a problem and incidents not related to the problem. The incidents related to the problem and a portion of the incidents not related to the problem may be used to train a logistic regression model or generate a decision tree. The trained logistic regression model may be used to determine the odds ratios or predict whether a new incident is related to a problem.

20 Claims, 9 Drawing Sheets

(51) Int. Cl.
*G06K 9/62* (2006.01)
*G06F 11/34* (2006.01)

(56) References Cited

U.S. PATENT DOCUMENTS

| | | |
|---|---|---|
| 6,609,122 B1 | 8/2003 | Ensor |
| 6,816,898 B1 | 11/2004 | Scarpelli |
| 7,020,706 B2 | 3/2006 | Cates |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |
| 7,610,512 B2 | 10/2009 | Gerber |
| 7,617,073 B2 | 11/2009 | Trinon |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,890,802 B2 | 2/2011 | Gerber |
| 7,925,981 B2 | 4/2011 | Pourheidari |
| 7,930,396 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter |
| 8,151,261 B2 | 4/2012 | Sirota |
| 8,224,683 B2 | 7/2012 | Manos |
| 8,266,096 B2 | 9/2012 | Navarrete |
| 8,402,127 B2 | 3/2013 | Solin |
| 8,457,928 B2 | 6/2013 | Dang |
| 8,478,569 B2 | 7/2013 | Scarpelli |
| 8,612,408 B2 | 12/2013 | Trinon |
| 8,646,093 B2 | 2/2014 | Myers |
| 8,674,992 B2 | 3/2014 | Poston |
| 8,689,241 B2 | 4/2014 | Naik |
| 8,743,121 B2 | 6/2014 | De Peuter |
| 8,832,652 B2 | 9/2014 | Mueller |
| 8,887,133 B2 | 11/2014 | Behnia |
| 9,065,783 B2 | 6/2015 | Ding |
| 9,098,322 B2 | 8/2015 | Apte |
| 9,122,552 B2 | 9/2015 | Whitney |
| 9,239,857 B2 | 1/2016 | Trinon |
| 9,317,327 B2 | 4/2016 | Apte |
| 9,363,252 B2 | 6/2016 | Mueller |
| 9,535,737 B2 | 1/2017 | Joy |
| 9,557,969 B2 | 1/2017 | Sharma |
| 9,645,833 B2 | 5/2017 | Mueller |
| 9,654,473 B2 | 5/2017 | Miller |
| 9,766,935 B2 | 9/2017 | Kelkar |
| 9,792,387 B2 | 10/2017 | George |
| 9,805,322 B2 | 10/2017 | Kelkar |
| 10,200,393 B2 * | 2/2019 | Modani ................ G06F 16/285 |
| 10,282,248 B1 * | 5/2019 | Gudka ................ G06F 11/0751 |
| 10,666,715 B2 * | 5/2020 | Chen ...................... H04L 67/10 |
| 2014/0129536 A1 * | 5/2014 | Anand ................... G06N 7/005 |
| | | 707/706 |
| 2017/0017537 A1 * | 1/2017 | Razin .................... G06F 11/321 |
| 2017/0048109 A1 * | 2/2017 | Kant ..................... H04L 41/147 |
| 2017/0178038 A1 * | 6/2017 | Guven ................. G06Q 30/016 |
| 2017/0264619 A1 | 9/2017 | Narayanaswamy et al. |
| 2017/0277582 A1 * | 9/2017 | Chen ..................... G06F 11/079 |
| 2017/0353477 A1 | 12/2017 | Faigon et al. |
| 2018/0060150 A1 * | 3/2018 | Cunico ................ G06F 11/0787 |
| 2018/0322508 A1 | 11/2018 | Walthers et al. |
| 2018/0324062 A1 * | 11/2018 | Chen ...................... H04L 67/10 |
| 2019/0056983 A1 * | 2/2019 | Jeong .................. G06F 11/0709 |
| 2019/0132191 A1 * | 5/2019 | Mann ................... G06F 11/0769 |
| 2020/0034211 A1 * | 1/2020 | Kumar P ............. G06K 9/6218 |
| 2020/0089652 A1 * | 3/2020 | Jayaraman ............. G06F 40/30 |
| 2020/0183769 A1 * | 6/2020 | Poghosyan ......... G06F 11/0709 |
| 2020/0210924 A1 * | 7/2020 | Ghosh ............. G06Q 10/06393 |
| 2020/0287779 A1 * | 9/2020 | Zafer ................... H04L 41/069 |
| 2020/0293946 A1 * | 9/2020 | Sachan ................. G06N 20/00 |
| 2021/0019209 A1 * | 1/2021 | Krishnaswamy ... G06F 11/0751 |

FOREIGN PATENT DOCUMENTS

| | | | | |
|---|---|---|---|---|
| WO | WO-2018156076 A1 * | 8/2018 | ............. | H04L 67/10 |
| WO | WO-2020072701 A1 * | 4/2020 | ............... | G06F 8/70 |

OTHER PUBLICATIONS

Luo, Chen et al., "Correlating Events with Time Series for Incident Diagnosis", Aug. 24, 2014, ACM KDD 2014, pp. 1583-1592 (Year: 2014).*

Wang, Xi-Zhao et al., "The Study of Unstable Cut-Point Decision Tree Generation Based-On The Partition Impurity", Jul. 12, 2009, Proceedings of the Eighth International Conference on Machine Learning and Cybernetics, Baoding, pp. 1891-1897 (Year: 2009).*

Xia, Fen et al., "Ranking with decision tree", Jan. 8, 2008, Knowledge Information Systems 2008, Springer-Verlag London Limited,, pp. 381-395 (Year: 2008).*

* cited by examiner

|  | INCIDENTS RELATED TO PRB | INCIDENTS NOT RELATED TO PRB |
|---|---|---|
| REPORTED IN US | 30 | 42 |
| NOT REPORTED IN US | 12 | 30 |
| TOTAL | 42 | 72 |

SYSTEMS AND METHODS FOR CLASSIFYING AND PREDICTING THE CAUSE OF INFORMATION TECHNOLOGY INCIDENTS USING MACHINE LEARNING

BACKGROUND

The present disclosure relates generally to information technology incidents, and more particularly to classifying and predicting the cause of the incidents using machine learning.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

Users of a cloud-based information technology platform may report undesired or unexpected incidents that occur as they use the platform. It may be useful to associate the incidents with a corresponding problem of the platform, as resolving the problem may also resolve the associated incidents. Moreover, associating the incidents with the corresponding problem may provide an understanding as to how widespread or significant the problem is. However, the process of reviewing each incident and determining whether the incident is related to a problem may be time-consuming and tedious.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In a first aspect, features may be extracted from a set of incidents (e.g., reported over a certain time period) that include incidents related to a problem and incidents not related to the problem. These features may include numerical/categorical features (such as a duration, location, or user group associated with an incident), text features (such as a description of an incident), and time-related features (such as a time of day or day of week associated with an incident). The incidents related to the problem and a portion of the incidents not related to the problem may be used to train a logistic regression model to determine an odds ratio representing a likelihood of an incident being related to the problem based on each feature of the incident. The trained logistic regression model may then be used on the remaining portion of incidents not related to the problem to determine the accuracy of the odds ratios associated with each feature of an incident. Multiple logistic regression models may be trained in this way to generate multiple sets of odds ratios for the features. Features whose odds ratios are sufficiently high and common between the multiple logistic regression models may be identified, thus correlating incidents having those features to the problem.

In a second aspect, the same features may be extracted from a set of incidents. The incidents related to a problem and a portion of the incidents not related to the problem may be used to create a decision tree that forms branches based on whether a feature is present in the incident. Multiple decision trees may be created using different portions of the incidents not related to the problem. The decision trees may be parsed and the most common splitting criteria, which may identify features that correlate incidents having the features to the problem, may be reported to the user.

In a third aspect, the same features may be extracted from a set of incidents. The incidents related to a problem and a portion of the incidents not related to the problem may be used to train a logistic regression model based on features of the incidents. Multiple logistic regression models may be trained, each logistic regression model corresponding to a different set of data. Each logistic regression model may then be applied to a new incident to predict whether the new incident is related to the corresponding problem, and the predictions may be evaluated to determine a single prediction. Moreover, multiple sets of logistic regression models may be trained, where each set of logistic regression models corresponds to a different problem. Each set multiple logistic regression model may then be applied to a new incident to predict which problem the new incident is related to.

In this manner, features of incidents may be quickly and conveniently extracted and analyzed to correlate whether the incidents are related to existing problems. Moreover, predictions may be made as to whether new incidents are associated with an existing problem. Thus, the present disclosure may facilitate understanding the relationship between incidents and problems, enabling quicker response to incidents as they arise based on the relationship between the incidents and the problems, and enable performance by the cloud-based information technology platform while reducing uncertainty of the source or cause of incidents.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
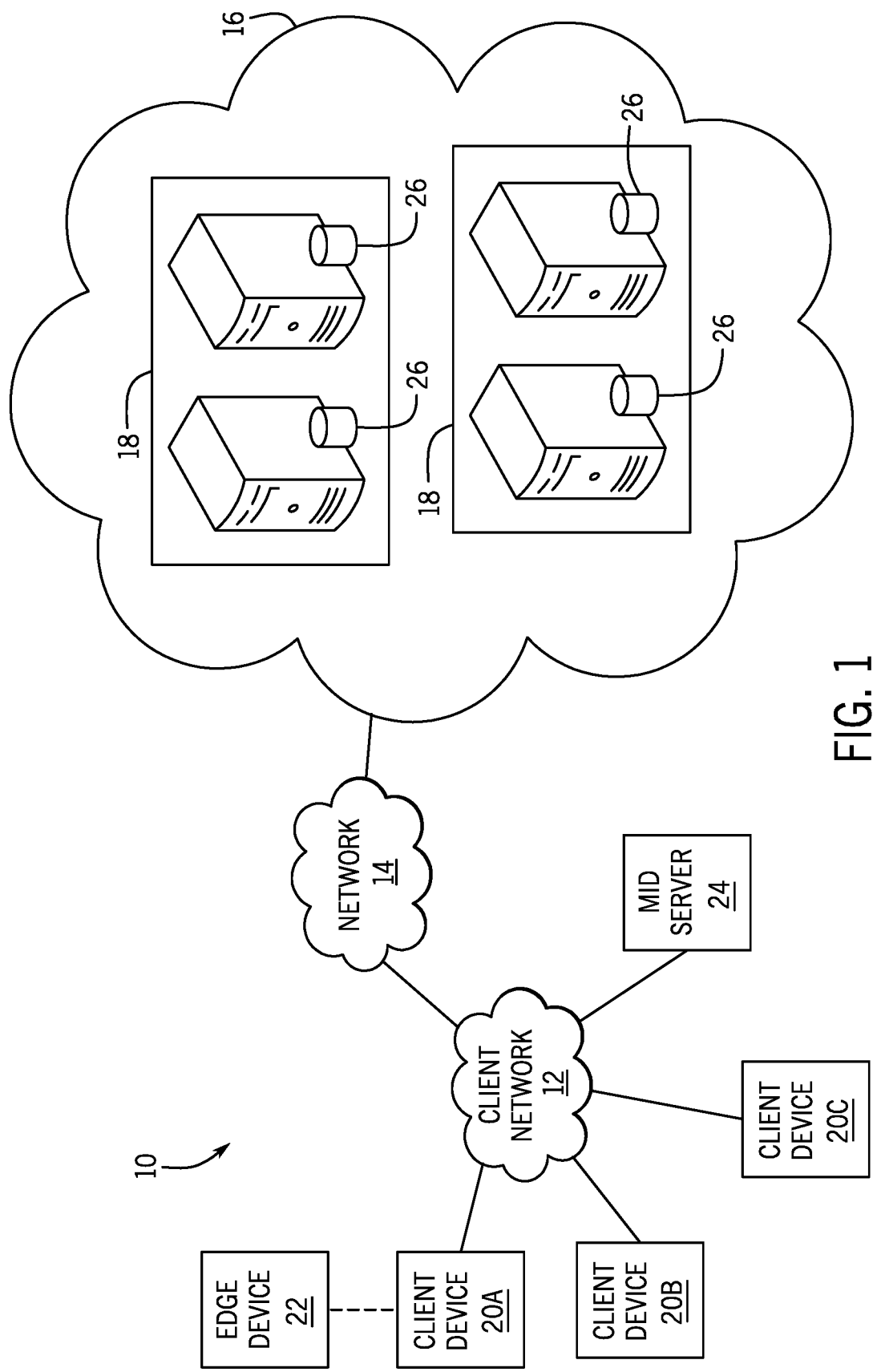
FIG. 1 is a block diagram of an embodiment of a cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

Users of a cloud-based information technology platform may report undesired or unexpected incidents that occur as they use the platform. In some cases, the incidents (e.g., INTs or "child incidents") may be associated with or caused by a major incident or problem (PRB) of the platform that has been previously identified or recognized. A major incident may be defined as an elevated level incident that is reported an excessive number of times within a relatively short period of time. A problem may be defined as an elevated level incident that is reported an excessive number of times, regardless of time. For the purposes of the present disclosure, major incidents and problems may collectively be referred to as "problems," while child incidents may be referred to as simply "incidents." It may be useful to associate incidents with a corresponding problem, as resolving the problem may also resolve the associated incidents. Moreover, associating these incidents with the corresponding problem may provide an understanding as to how widespread or significant the problem is.

Because the process of reviewing each incident and determining whether the incident is related to a problem may be time-consuming and tedious, a first aspect of the present disclosure provides systems and methods for classifying incidents based on determining an odds ratio that represents a likelihood of an incident being related to the problem. In particular, features may be extracted from a set of incidents (e.g., that are reported over a certain time period) that include incidents related to a problem and incidents not related to the problem. These features may include numerical/categorical features (such as a duration, location, or user group associated with an incident), text features (such as a description of an incident), and time-related features (such as a time of day or day of week associated with an incident). The incidents related to the problem and a portion of the incidents not related to the problem may be used to train a logistic regression model to determine the odds ratio based on each feature of the incident. The trained logistic regression model may then be used on the remaining portion of incidents not related to the problem to determine the accuracy of the odds ratios associated with each feature of an incident. Multiple logistic regression models may be trained in this way to generate multiple sets of odds ratios for the features and reduce variance that may result from small sets of training data (e.g., small numbers of incidents used to train the logistic regression models). Features whose odds ratios are sufficiently high and common between the multiple logistic regression models may be identified, thus correlating incidents having those features to the problem.

A second aspect of the present disclosure provides systems and methods for classifying incidents based on determining a decision tree that forms branches based on whether a feature is present in the incident. In particular, the same features may be extracted from a set of incidents. The incidents related to a problem and a portion of the incidents not related to the problem may be used to create the decision tree. Multiple decision trees may be created using different portions of the incidents not related to the problem. The decision trees may be parsed and the most common splitting criteria, which may identify features that correlate incidents having the features to the problem, may be reported to the user.

A third aspect provides systems and methods for predicting whether a new incident is related to a problem. In particular, the same features may be extracted from a set of incidents. The incidents related to a problem and a portion of the incidents not related to the problem may be used to train a logistic regression model based on features of the incidents. Multiple logistic regression models may be trained, each logistic regression model corresponding to a different set of data. Each logistic regression model may then be applied to a new incident to predict whether the new incident is related to the corresponding problem, and the predictions may be evaluated or aggregated to determine a single prediction. Moreover, multiple sets of logistic regression models may be trained, where each set of logistic regression models corresponds to a different problem. Each set multiple logistic regression model may then be applied to a new incident to predict which problem the new incident is related to.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
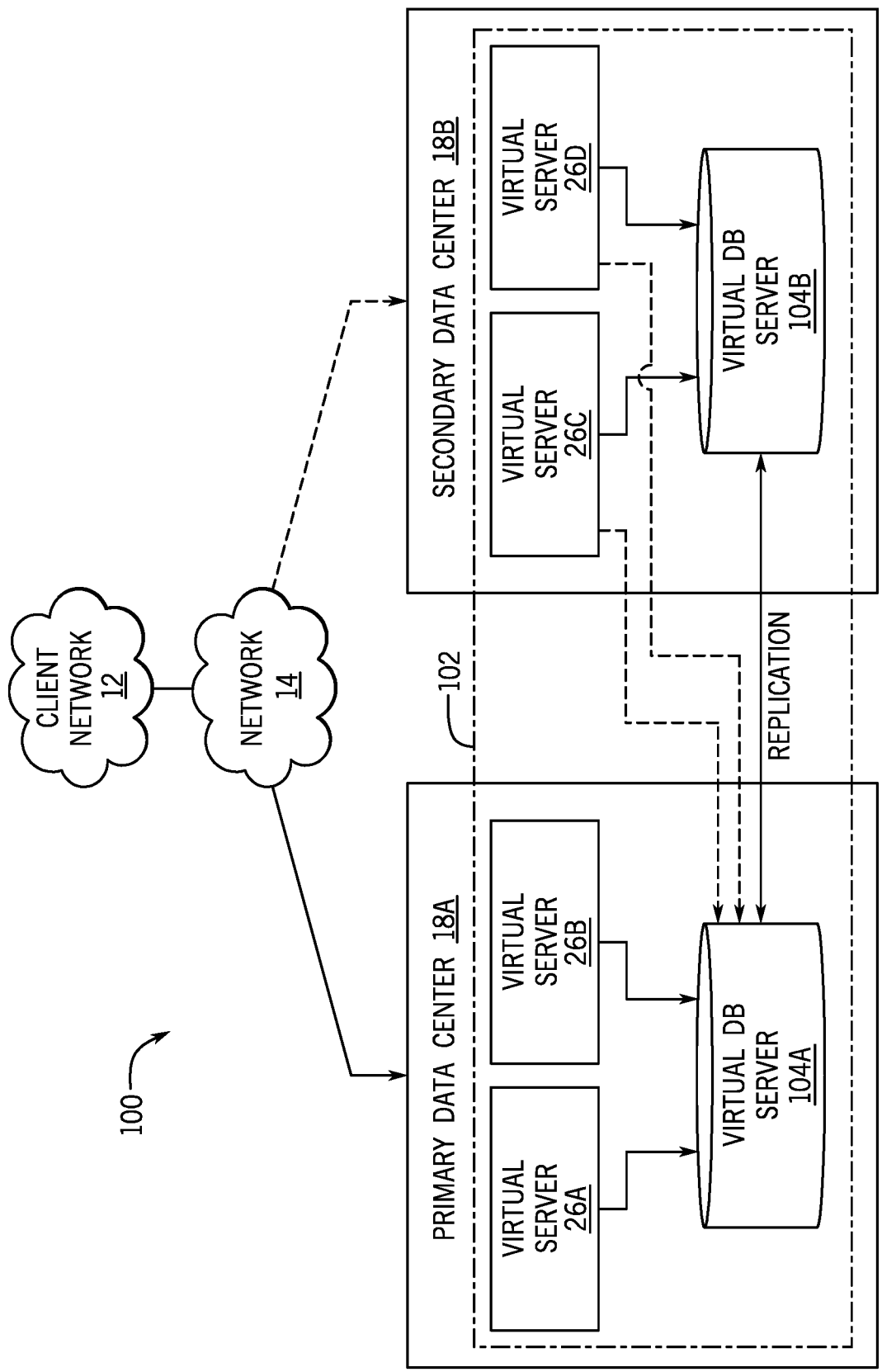
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
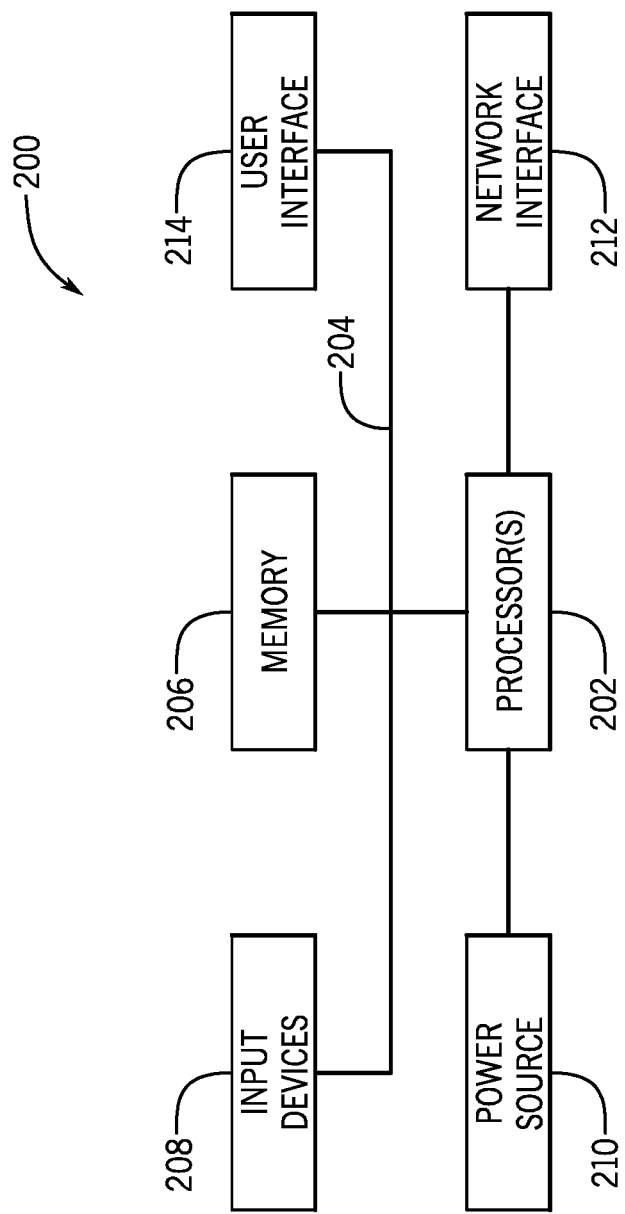
FIG. 3 is a block diagram of a computing device utilized in a computing system that may be present in FIG. 1 or 2, in accordance with aspects of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented. For example, the system shown in FIG. 3 may be part of the management, instrumentation, and discovery (MID) server 24 that facilitates communication of data between the network hosting the platform 16, other external applications, data sources, and services, and the client network 12, and/or part of the network environment and service provider cloud infrastructure client instance 102 associated with (e.g., supported and enabled by) dedicated virtual servers (e.g., virtual servers 26A, 26B, 26C, and 26D) and dedicated database servers (e.g., virtual database servers 104A and 104B).

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing system 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Users of the cloud-based platform 16 may report undesired or unexpected incidents that occur as they use the platform 16. In some cases, the incidents (e.g., INTs or "child incidents") may be associated with or caused by a major incident or problem (PRB) that has been previously identified or recognized. A major incident may be defined as an elevated level incident that is reported an excessive number of times within a relatively short period of time. A problem may be defined as an elevated level incident that is reported an excessive number of times, regardless of time. For the purposes of the present disclosure, major incidents and problems may collectively be referred to as "problems," while child incidents may be referred to as simply "incidents." It may be useful to associate incidents with a corresponding problem, as resolving the problem may also resolve the associated incidents. Moreover, associating these incidents with the corresponding problem may provide an understanding as to how widespread or significant the problem is.

Figure 4:
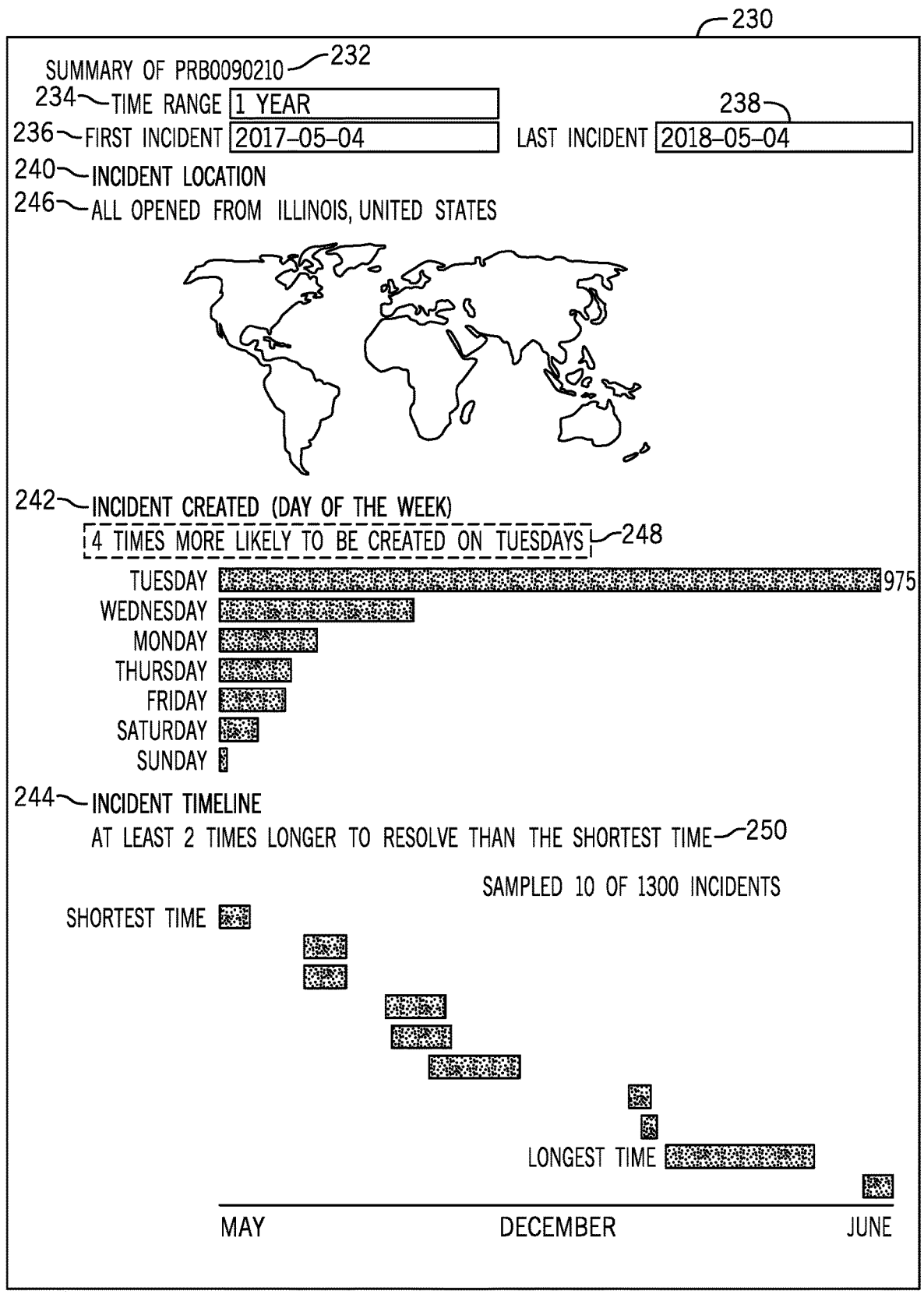
FIG. 4 is a diagram of a user interface that visualizes a problem, incidents associated with the problem, and features of the incidents, according to embodiments of the present disclosure.

Each incident may include one or more features that may facilitate correlating the incident with a problem. The features may include numerical/categorical features (such as a duration, location, or user group associated with an incident), text features (such as a description of an incident), and time-related features (such as a time of day or day of week associated with an incident). FIG. 4 is a diagram of a user interface 230 that visualizes a problem 232, incidents associated with the problem 232, and features of the incidents, according to embodiments of the present disclosure. In particular, the user interface 230 illustrates problem PRB0090210, and may provide details that may be helpful in describing the problem 232 by illustrating features of incidents associated with the problem 232. For example, the user interface 230 illustrates a time range 234 of the problem 232, a first incident 236 associated with the problem 232, a last or most recently reported incident 238 associated with the problem 232, a geographical location 240 from where incidents associated with the problem 232 are reported, days of the week 242 that incidents associated with the problem 232 are reported, and durations (e.g., lifetimes) 244 of the incidents associated with the problem 232.

The user interface 230 also provides analysis of the features of the incidents associated with the problem 232, according to embodiments of the present disclosure. For example, the user interface 230 provides categorical or geographical analysis 246 of the incidents showing, based on the geographical location 240 from where the incidents are reported, all incidents are opened from Illinois. Similarly, the user interface 230 provides time-related analysis 248 of the incidents showing, based on the days of the week 242 that the incidents are reported, incidents are four times more likely to be created on Tuesdays. The user interface 230 also provides numerical or duration-related analysis 250 of the incidents showing, based on the durations 244 of the incidents, incidents are at least two times longer to resolve than the shortest resolution time for the incidents. These analyses correlate features of the incidents to the existing problem 232, which may facilitate understanding the relationship between incidents and the problem 232 and thus enable quicker response to incidents as they arise. Moreover, these analyses may enable performance by the cloud-based platform 16 while reducing uncertainty of the source or cause of incidents.

Figure 5:
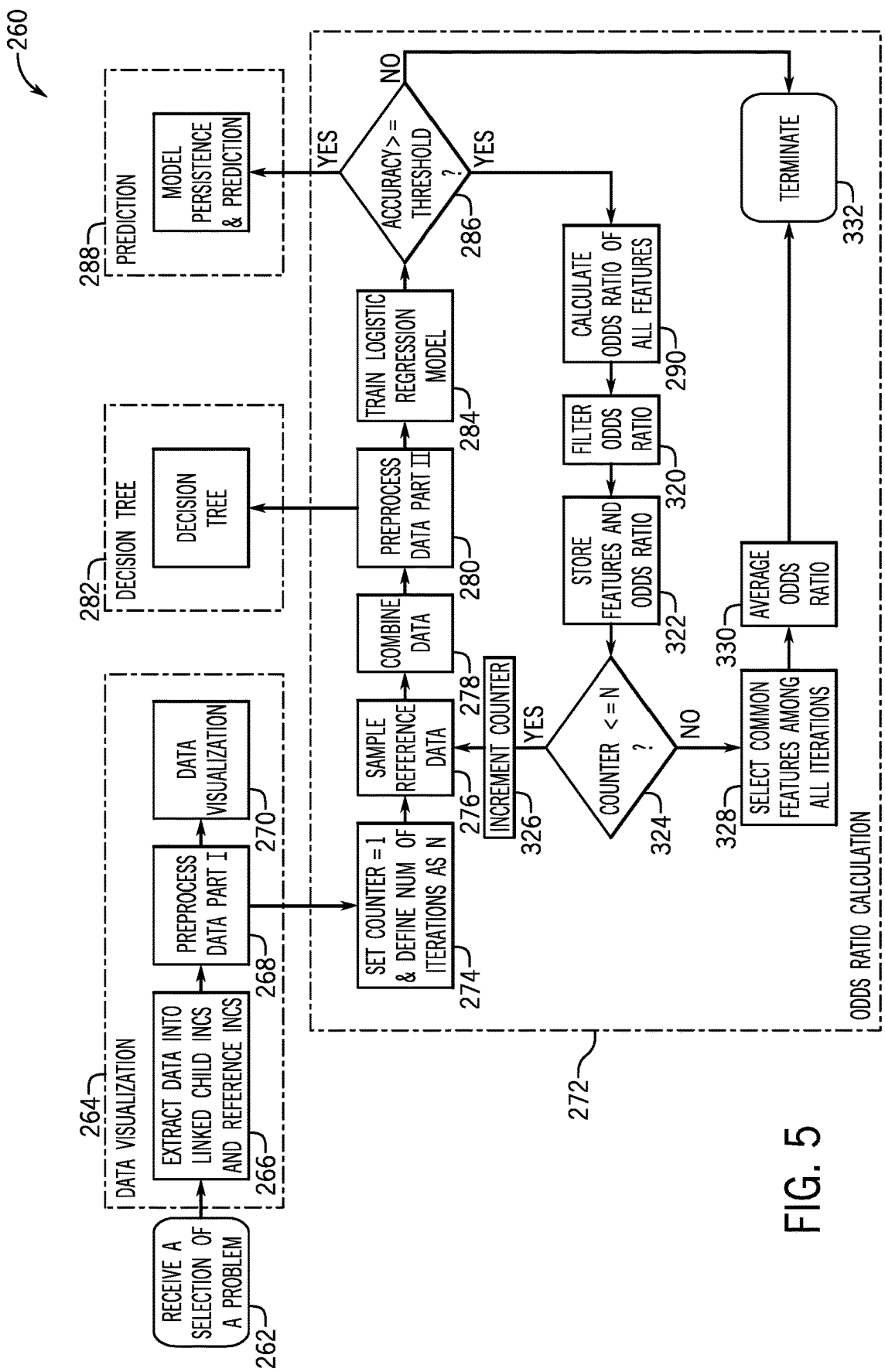
FIG. 5 is a flow diagram of a process that determines odds ratios for features that represent likelihoods of incidents having the features being related to a problem, according to embodiments of the present disclosure.

A first aspect of the present disclosure is shown in FIG. 5, which is a flow diagram of a process 260 that determines odds ratios for features that represent likelihoods of incidents having the features being related to a problem, according to embodiments of the present disclosure. In some embodiments, the process 260 may be implemented in the form of a software application that includes instructions executable by at least one suitable processor of the cloud computing system 10, such as a processor of the MID server 24 or the client instance 102. In some embodiments, the management server 24 or the client instance 102 may be implemented as the computing system 200 of FIG. 3, and, as such, the process 260 may be implemented by the processor 202. The illustrated process 260 is merely provided as an example, and in other embodiments, certain illustrated steps of the process 260 may be performed in other orders, skipped, or repeated, in accordance with the present disclosure.

As illustrated, in process block 262, the processor 202 receives a selection of a problem. The problem may refer to either an actual problem or a major incident, where an actual problem is an elevated level incident that is reported an excessive number of times, regardless of time, and a major incident is an elevated level incident that is reported an excessive number of times within a relatively short period of time. In some instances, a user or system administrator may select the problem they desire to analyze or classify.

As part of a data visualization portion 264 of the process 260, in process block 266, the processor 202 extracts data into two portions: linked child incidents and reference incidents. The data may be any suitable set of incidents. For example, the data may include a set of incidents that are reported during a specified time range. It should be understand that the term "incidents" refers to child incidents, which may be associated with a problem (including a major incident). The linked child incidents may include incidents related to the selected problem, while the reference incidents are the remaining incidents of the set of incidents (e.g., of the data). As such, the reference incidents may not be related to the selected problem.

In process block 268, the processor 202 preprocesses the data (e.g., the set of incidents). In particular, the processor 202 may determine or identify the features in each incident of the set of incidents, and store the features (e.g., in a table linking the features to the corresponding incidents). The features may be stored, for example, in the memory 206.

In process block 270, the processor 202 provides data visualization of the preprocessed data (e.g., to a user or system administrator). For example, the processor 202 may display the user interface 230 shown in FIG. 4, which visualizes the problem, incidents associated with the problem, and features of the incidents.

As part of an odds ratio calculation portion 272 of the process 260, in process block 274, the processor 202 sets a counter to one and defines a number of iterations as N. The odds ratio may represent a likelihood of an incident being related to the problem based on each feature of the incident. Each iteration may generate and train a logistic regression model that is used to calculate a set of odds ratios for features of a set of incidents of the preprocessed data. Because the resulting sets of odds ratios calculated (e.g., one set per iteration) may be averaged to realize more accurate odds ratios (e.g., one for each feature), the number of iterations N may include any suitable number of times that the set of odds ratios should be calculated in order to provide an accurate representation of the odds ratios. For instance, N may be between 3 to 10000, 10 to 1000, 30 to 100, or any other suitable number of iterations.

In process block 276, the processor 202 samples the reference data (e.g., the reference incidents). The processor 202 may do so because, in many cases, the reference data may be much larger (e.g., on the magnitude of 10, 100, 1000, or more times) than the linked child incidents. As such, the processor 202 may sample the reference data to avoid the larger, full set of reference data skewing the resulting calculated odds ratios. For example, the processor 202 may sample a set of reference data that includes a number of reference instances that is one to ten (e.g., two or three) times larger than the number of linked child instances. Because each iteration N includes sampling the reference data, each logistic regression model may be trained using a different (sampled) set of the reference data.

In process block 278, the processor 202 combines the data. That is, the processor 202 may combine the linked child incidents and the sampled reference incidents to generate a data set (e.g., an "iteration data set") to be used for this iteration.

In process block 280, the processor 202 preprocesses the data. That is, the processor 202 may determine or identify the features in each incident of the iteration data set, and store the features (e.g., in a table linking the features to the corresponding incidents). The features may be stored, for example, in the memory 206. As illustrated, the preprocessed data may be used in a decision tree portion 282, which will be discussed in FIG. 7 below.

In process block 284, the processor 202 trains a logistic regression model based on the features of an incident. The logistic regression model may use predictive analysis to describe the relationship between the features of an incident and the problem. In particular, because the processor 202 knows which incidents of the iteration data set are related to the problem (e.g., the linked child incidents) and which incidents of the iteration data set are not (e.g., the reference incidents), the logistic regression model may use each feature of an incident and generate an expression or equation that relates the features of linked child incidents to the problem, such as an expression or equation that represents a likelihood that an incident is related to the problem based on the feature being part of the incident. The logistic regression model may be trained to determine coefficients of the features, which may be an intermediate result of an odds ratio.

In some embodiments, a first portion of the iteration data set may be used to train the logistic regression model, while a second, remaining portion of the data set may be used to later test the accuracy of the trained logistic regression model. For example, 40-95%, 50-80%, 65-75% or any other suitable portion (e.g., 70%) of the iteration data set may be used to train the logistic regression model, while the remainder of the iteration data set (60-5%, 50-30%, 35-25%, or any other suitable remaining portion (e.g., 30%), respectively) may be used to verify the accuracy of the trained logistic regression model.

In decision block 286, the processor 202 determines whether the accuracy of the trained logistic regression model is greater than or equal to a threshold accuracy level. In particular, the processor 202 may apply the trained logistic regression model to the remaining portion of the iteration data set that was not used to train the logistic regression model. Because the processor 202 knows which incidents of the iteration data set are related to the problem (e.g., the linked child incidents) and which incidents of the iteration data set are not (e.g., the reference incidents), the processor 202 may determine that the trained logistic regression model is accurate when it correctly identifies linked child incidents of the remaining portion of the iteration data set as related to the problem, and when it correctly identifies reference incidents of the remaining portion of the iteration data set as unrelated to the problem. The threshold accuracy level may be any suitable accuracy level that indicates that the trained logistic regression model is sufficiently accurate. For example, the threshold accuracy level may be between 50-100%, 60-90%, 70-80%, or any other suitable accuracy level, such as 70%.

If the processor 202 determines that the accuracy of the trained logistic regression model is greater than or equal to the threshold accuracy level, then the trained logistic regression model may be used in a prediction portion 288, which will be discussed in FIG. 9 below. Additionally, the processor 202, in process block 290, calculates odds ratios of each feature of the data (e.g., identified when preprocessing the data in process block 268). In some embodiments, the processor 202 may calculate odds ratios for the features of the linked child incidents of the data. An odds ratio may represent a likelihood of an incident being related to the problem based on a feature of the incident.

Figures 6, 8:
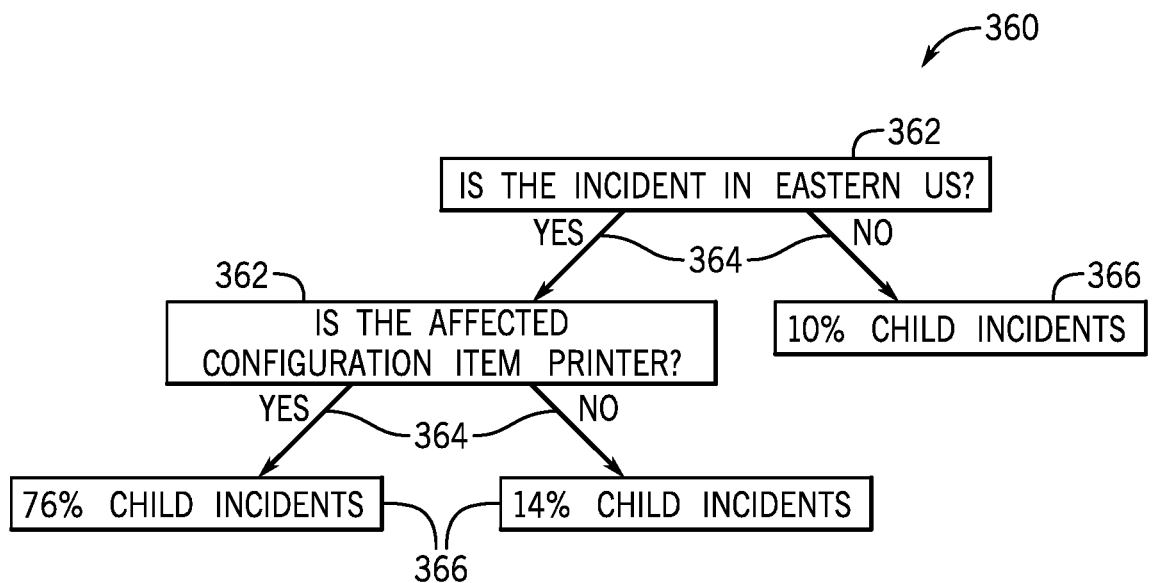
FIG. 6 is a table illustrating data used to calculate an odds ratio, according to embodiments of the present disclosure.
FIG. 8 is a diagram of an example decision tree, according to embodiments of the present disclosure.

As an example, FIG. 6 is a table 300 illustrating data used to calculate an odds ratio, according to embodiments of the present disclosure. The table 300 examines the feature of geographical location, and more particular, of the feature of an incident being reported in the United States. As illustrated, for an iteration data set, there may be 42 linked child incidents or incidents related to the problem and 72 reference incidents or incidents not related to the problem, as shown in the bottom row (entitled "Total") 302 of the table 300. Of the 42 linked child instances, 30 were reported in the U.S., and 12 were reported in locations other than the U.S., as shown in the first row (entitled "Reported in U.S.") 304 and the second row (entitled "Not reported in U.S.") 306. Of the 72 reference instances, 42 were reported in the U.S., and 30 were reported in locations other than the U.S., as shown in the first row 304 and the second row 306. The odds ratio may be calculated by dividing a ratio of the number of linked child incidents having the feature to the number of linked child incidents not having the feature with a ratio of the number of reference incidents having the feature to the number of reference incidents not having the feature. That is, (30/12)/(42/30)=1.7857. As such, the odds ratio for the feature of an incident being reported in the United States may be approximately 1.79, which indicates that incidents reported in the U.S. are approximately 1.79 times more likely to be related to the problem than incidents reported in locations other than the U.S. The processor 202 may perform this calculation to determine an odds ratio for each feature of the data (e.g., identified when preprocessing the data in process block 268), or for the features of the linked child incidents of the data. In some embodiments, the odds ratio for a feature may be calculated by taking the exponent of the corresponding coefficient of the feature (as determined by training the logistic regression model).

In process block 320, the processor 202 filters the calculated odds ratios. In particular, the processor may rank or order the odds ratios (e.g., highest to lowest). Higher odds ratios may indicate that a feature is more likely to correlate an incident having the feature to the problem. In some embodiments, the processor 202 may filter the odds ratios by selecting any suitable number or percentage of the highest ranked odds ratios (e.g., the top 5-50% odds ratios, the top 15-40% odds ratios, the top 25-30% odds ratios, such as the top 25% odds ratios). In alternative or additional embodiments, the processor 202 may filter the odds ratios by selecting the odds ratios that exceed any suitable threshold odds ratio value (e.g., 0.5-500, 0.75-250, 1.0-10, such as 1.0).

In process block 322, the processor 202 stores the features and corresponding odds ratios. For example, the processor 202 stores the features and corresponding odds ratios in a table. The features and corresponding odds ratios may be stored, for example, in the memory 206.

In decision block 324, the processor 202 determines whether the counter is less than or equal to the number of iterations N. If so, the processor 202, in process block 326, increments the counter, and then proceeds to process block 276 to sample the reference data (e.g., the reference incidents) again to generate a new sample of reference data to train a new logistic regression model and determine a new set of odds ratios.

If the processor 202 determines that the counter is greater than the number of iterations N (in decision block 324), then the number of iterations N has been performed. The processor 202 then, in process block 328, selects common features among all iterations. In particular, the processor 202 may select those features that are common (e.g., identified) and stored among all iterations N that have been performed. In some embodiments, the processor 202 may select features based on the highest ranked corresponding odds ratios (e.g., the top 5-50% odds ratios, the top 15-40% odds ratios, the top 25-30% odds ratios, such as the top 25% odds ratios). In alternative or additional embodiments, the processor 202 may select features that have corresponding odds ratios that exceed any suitable threshold odds ratio value (e.g., 0.5-500, 0.75-250, 1.0-10, such as 1.0).

In process block 330, the processor 202 averages each set of odds ratios corresponding to each selected feature. That is, for each feature that is common and identified from process block 328, the processor 202 may average the N number of odds ratios for that feature realized through the N iterations. In additional or alternative embodiments, the processor 202 may generate any suitable representative value for each set of odds ratios corresponding to each selected feature, such as a median, mode, maximum, or minimum value.

In process block 332, the processor 202 then terminates the process 260. Similarly, from decision block 286, if the processor 202 determines that the accuracy of the trained logistic regression model is less than the threshold accuracy level, then the processor 202 also terminates the process 260. In some embodiments, if the processor 202 determines that the accuracy of the trained logistic regression model is less than the threshold accuracy level, then the processor 202 may advance to process block 326 to increment the counter and begin another iteration.

In this manner, the processor 202 may perform the process 260 to classify incidents based on determining odds ratios that represent likelihoods of incidents being related to a problem. In particular, features with the highest odds ratios, thus highly correlating incidents having those features to the problem, may be identified, and may be reported (e.g., electronically mailed or displayed on the user interface 230 of FIG. 4) to a user or system administrator. The user or system administrator may thus be made aware of those features that correlate incidents to the problem.

Figure 7:
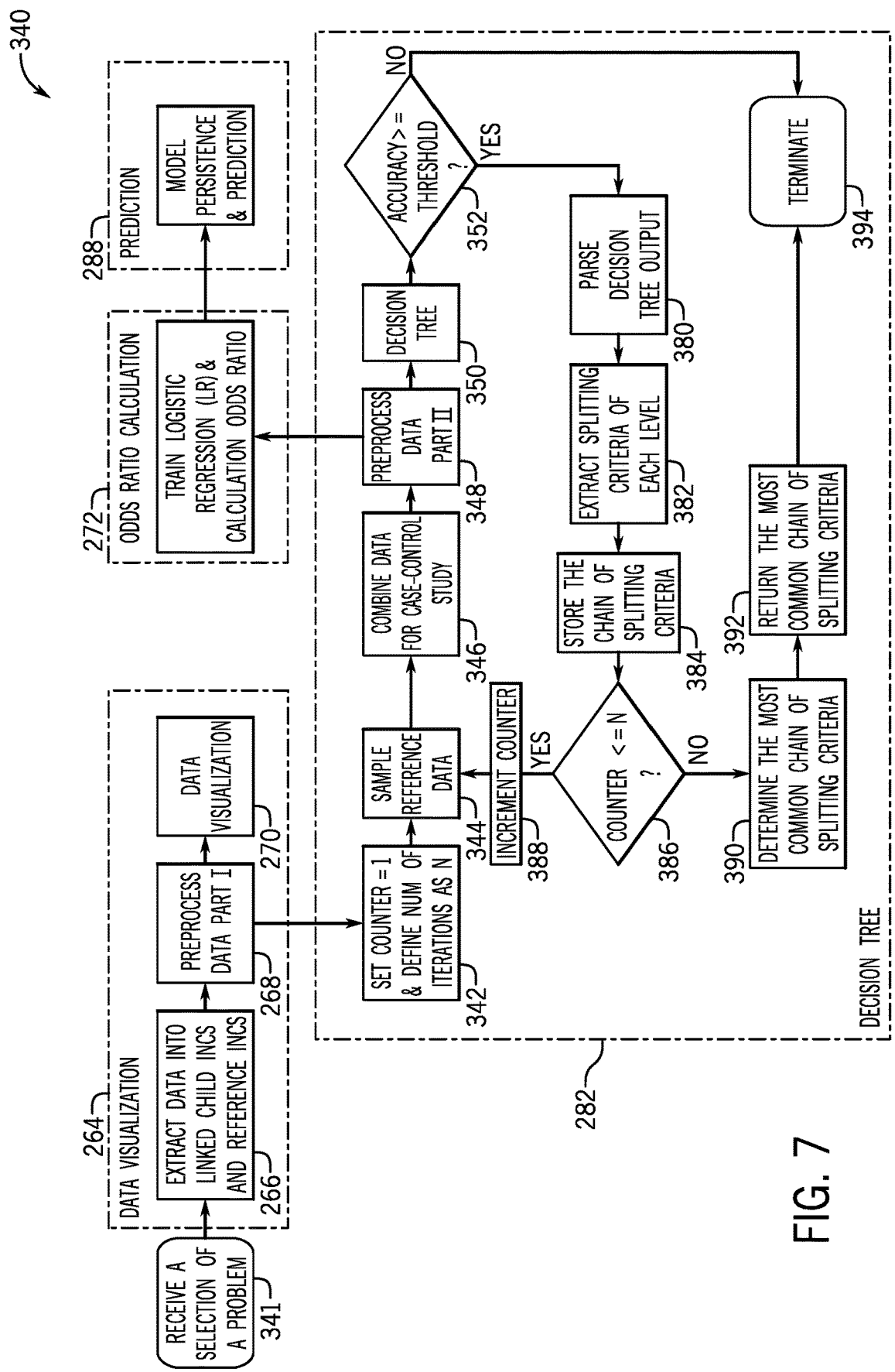
FIG. 7 is a flow diagram of a process that classifies incidents based on determining a decision tree that forms branches based on whether a feature is present in an incident, according to embodiments of the present disclosure.

A second aspect of the present disclosure is shown in FIG. 7, which is a flow diagram of a process 340 that classifies incidents based on determining a decision tree that forms branches based on whether a feature is present in an incident, according to embodiments of the present disclosure. In some embodiments, the process 340 may be implemented in the form of a software application that includes instructions executable by at least one suitable processor of the cloud computing system 10, such as a processor of the MID server 24 or the client instance 102. In some embodiments, the management server 24 or the client instance 102 may be implemented as the computing system 200 of FIG. 3, and, as such, the process 260 may be implemented by the processor 202. The illustrated process 340 is merely provided as an example, and in other embodiments, certain illustrated steps of the process 340 may be performed in other orders, skipped, or repeated, in accordance with the present disclosure.

As illustrated, in process block 341, the processor 202 receives the selection of the problem. As part of the data visualization portion 264 of the process 340, in process block 266, the processor 202 extracts the data into the two portions: the linked child incidents and the reference incidents. In process block 268, the processor 202 preprocesses the data (e.g., the set of incidents) by, for example, determining or identifying the features in each incident of the set of incidents. In process block 270, the processor 202 provides the data visualization of the preprocessed data (e.g., to a user or system administrator).

As part of the decision tree portion 282 of the process 340, in process block 342, the processor 202 sets a counter to one and defines a number of iterations as N. The decision tree may form branches based on whether a feature is present in an incident. Each iteration may calculate a decision tree for features of a set of incidents of the preprocessed data. Because the branching or splitting criteria may be analyzed to determine features that most correlate with the problem, the number of iterations N may include any suitable number of times that the decision trees should be generated in order to provide an accurate representation of branching or splitting criteria. For instance, N may be between 3 to 10000, 10 to 1000, 30 to 100, or any other suitable number of iterations.

In process block 344, the processor 202 samples the reference data (e.g., the reference incidents). Because each iteration N includes sampling the reference data, each decision tree may be generated using a different (sampled) set of the reference data. In process block 346, the processor 202 combines the data. That is, the processor 202 may combine the linked child incidents and the sampled reference incidents to generate a data set (e.g., an "iteration data set") to be used for this iteration. In process block 348, the processor 202 preprocesses the data. That is, the processor 202 may determine or identify the features in each incident of the iteration data set. As illustrated, the preprocessed data may be used in the odds ratio calculation portion 272, which is discussed in FIG. 5 above.

In process block 350, the processor 202 generates a decision tree which forms branches or splits based on each feature of an incident. The decision tree may form paths of attributes, which may facilitate identifying interactions between attributes. The paths of attributes may be used to identify the incidents, thus providing a starting point for root cause analysis. For example, FIG. 8 is a diagram of an example decision tree 360, according to embodiments of the present disclosure. The decision tree 360 includes branching or splitting criteria 362, paths of attributes 364, and incidents 366.

The processor 202 may determine the splitting criteria 362 based on certain measures of the decision tree. In some embodiments, the processor 202 may determine the splitting criteria 362 based on Gini impurity, which measure the impurity of a node (e.g., the splitting criteria 362 and/or the incidents 366 of the decision tree 360). The impurity of a node may be related to how homogeneous the samples or incidents within a node are. A node may be pure when all samples or incidents 366 belong to the same class. In additional or alternative embodiments, the processor 202 may determine the splitting criteria 362 based on the number of samples or incidents 366 in each node. For example, the processor 202 may determine the splitting criteria 362 based on generating the most equal sized number of incidents 366 when splitting. In one embodiment, the processor 202 may determine the splitting criteria 362 based on a value array that shows the distribution of the incidents 366 per class. It should be understood that the processor 202 may determine the splitting criteria 362 of the decision tree 360 based on any suitable measure or technique, including gain ratio, information gain, entropy, or the like.

The processor 202 may determine, at each level (e.g., a first level corresponding to the splitting criteria 362, a second level corresponding to the splitting criteria 362, and so on) of the decision tree, whether each resulting group of incidents (e.g., 366) is under a threshold percentage of incidents. If so, the processor 202 may continue splitting the decision tree by splitting the higher percentage group of incidents (e.g., the majority of incidents). For example, for the decision tree 360, the processor 202 may use a threshold percentage as 80% (though any suitable threshold percentage may be used, such as between 20 to 95%, between 30 to 85%, or between 40 to 80%). As such, at the first level corresponding to the splitting criteria 362, the group of incidents exceeds the threshold percentage, as the group of incidents at the first level is 100% (e.g., all the incidents). After applying the splitting criteria 362, both of the groups of resulting incidents are still not under the threshold percentage of 80%. That is, while the group of incidents that do not occur in the Eastern U.S. 366 (10%) is under the threshold percentage of 80%, the remaining group of incidents that occur in the Eastern U.S. (90%) is not. Because the group of incidents that occur in the Eastern U.S. (90%) is the higher percentage group (compared to the group of incidents that do not occur in the Eastern U.S. 366 (10%)), the processor 202 splits the group of incidents that occur in the Eastern U.S. As illustrated, the processor 202 splits the group of incidents that occur in the Eastern U.S. into resulting groups of those affected by a configuration item printer (76%) and those not affected by a configuration item printer (14%). Because both groups of incidents are now under the threshold percentage of 80%, the processor 202 ceases splitting the decision tree.

In some embodiments, a first portion of the iteration data set may be used to generate the decision tree, while a second, remaining portion of the data set may be used to later test the accuracy of the decision tree. For example, 40-95%, 50-80%, 65-75% or any other suitable portion (e.g., 70%) of the iteration data set may be used to train the decision tree, while the remainder of the iteration data set (60-5%, 50-30%, 35-25%, or any other suitable remaining portion (e.g., 30%), respectively) may be used to verify the accuracy of the decision tree.

In decision block 352, the processor 202 determines whether the accuracy of the decision tree is greater than or equal to a threshold accuracy level. In particular, the processor 202 may apply the decision tree to the remaining portion of the iteration data set that was not used to generate the decision tree. Because the processor 202 knows which incidents of the iteration data set are related to the problem (e.g., the linked child incidents) and which incidents of the iteration data set are not (e.g., the reference incidents), the processor 202 may determine that the decision tree is accurate when it correctly identifies linked child incidents of the remaining portion of the iteration data set as related to the problem, and when it correctly identifies reference incidents of the remaining portion of the iteration data set as unrelated to the problem. The threshold accuracy level may be any suitable accuracy level that indicates that the decision tree is sufficiently accurate. For example, the threshold accuracy level may be between 50-100%, 60-90%, 70-80%, or any other suitable accuracy level, such as 70%.

If the processor 202 determines that the accuracy of the decision tree is greater than or equal to the threshold accuracy level, then the processor 202, in process block 380, parses the decision tree output (e.g., the splitting criteria 362, paths of attributes 364, and incidents 366 of the decision tree). In process block 382, the processor 202 then extracts the splitting criteria 362 of the decision tree. In process block 384, the processor 202 stores the chain of splitting criteria 362 in, for example, a table. In particular, the processor 202 may store the splitting criteria 362, along with the sequence, structure, and/or hierarchy of the splitting criteria 362 in, for example, the memory 206.

In decision block 386, the processor 202 determines whether the counter is less than or equal to the number of iterations N. If so, the processor 202, in process block 388, increments the counter, and then proceeds to process block 344 to sample the reference data (e.g., the reference incidents) again to generate a new sample of reference data to generate a new decision tree.

If the processor 202 determines that the counter is greater than the number of iterations N (in decision block 386), then the number of iterations N has been performed. The processor 202 then, in process block 390, determines the most common chain of splitting criteria among all iterations. In particular, the processor 202 may select the chain of splitting criteria that is generated most frequently among the iterations of generated decision trees. In some embodiments, the processor 202 may determine multiple chains of splitting criteria that are the most frequently generated (e.g., the top 1-30, 3-25, or 5-10 most frequently generated chains of splitting criteria, such as the top three most frequently generated chains of splitting criteria).

In process block 392, the processor 202 returns the most common chain of splitting criteria determined in process block 390. In some embodiments, the processor 202 may return multiple chains of splitting criteria that are the most frequently generated (e.g., the top 1-30, 3-25, or 5-10 most frequently generated chains of splitting criteria, such as the top three most frequently generated chains of splitting criteria).

In process block 394, the processor 202 terminates the process 340. Similarly, from decision block 352, if the processor 202 determines that the accuracy of the decision tree is less than the threshold accuracy level, then the processor 202 also terminates the process 340. In some embodiments, if the processor 202 determines that the accuracy of the decision tree is less than the threshold accuracy level, then the processor 202 may advance to process block 388 to increment the counter and begin another iteration.

In this manner, the processor 202 may perform the process 340 to classify incidents based on determining decision trees that form branches based on whether a feature is present in an incident. In particular, the processor 202 may parse the decision trees and return the most common splitting criteria, which may identify features that correlate incidents having the features to the problem. The processor 202 may then report these features (e.g., by electronic mail or display on the user interface 230 of FIG. 4) to a user or system administrator. The user or system administrator may thus be made aware of those features that correlate incidents to the problem.

Figure 9:
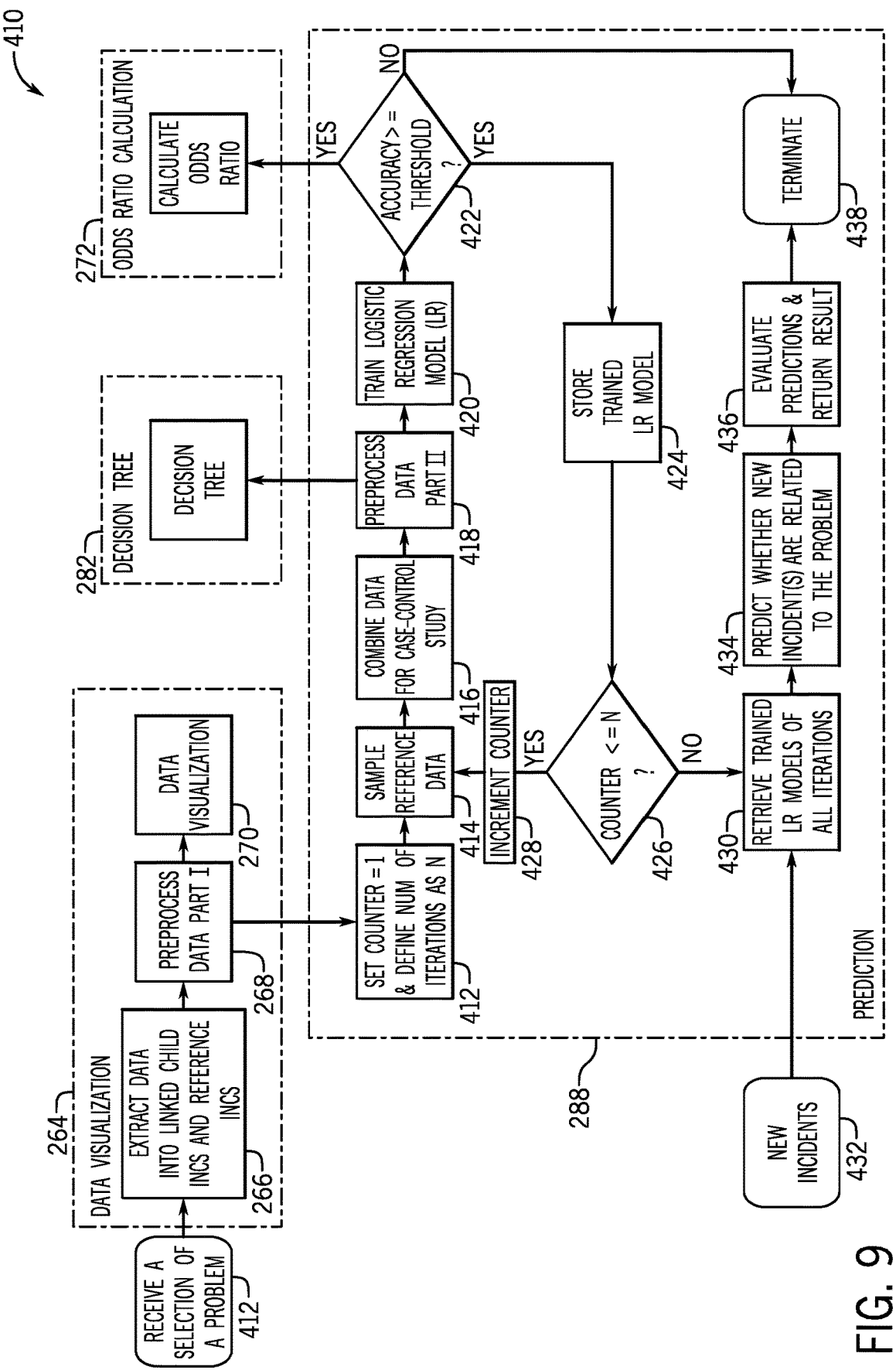
FIG. 9 is a flow diagram of a process that predicts whether a new incident is related to a problem, according to embodiments of the present disclosure.

A third aspect of the present disclosure is shown in FIG. 9, which is a flow diagram of a process 410 that predicts whether a new incident is related to a problem, according to embodiments of the present disclosure. In some embodiments, the process 410 may be implemented in the form of a software application that includes instructions executable by at least one suitable processor of the cloud computing system 10, such as a processor of the MID server 24 or the client instance 102. In some embodiments, the management server 24 or the client instance 102 may be implemented as the computing system 200 of FIG. 3, and, as such, the process 410 may be implemented by the processor 202. The illustrated process 410 is merely provided as an example, and in other embodiments, certain illustrated steps of the process 410 may be performed in other orders, skipped, or repeated, in accordance with the present disclosure.

As illustrated, in process block 412, the processor 202 receives the selection of the problem. As part of the data visualization portion 264 of the process 340, in process block 266, the processor 202 sets a counter to one and defines a number of iterations as N. Each iteration may generate and train a logistic regression model that may estimate or predict whether an incident is related to the selected problem based on the features of the incident. The logistic regression model may be generated and trained using the incidents related to the selected problem and a portion of the incidents not related to the selected problem. Because prediction of whether an incident is related to the selected problem is based on the largest number of logistic regression models predicting that the incident is related to the selected problem, the number of iterations N may include any suitable number of logistic regression models that should be generated and trained in order to provide an accurate prediction. For instance, N may be between 3 to 10000, 10 to 1000, 30 to 100, or any other suitable number of iterations.

In process block 414, the processor 202 samples the reference data (e.g., the reference incidents). Because each iteration N includes sampling the reference data, each logistic regression model may be trained using a different (sampled) set of the reference data. In process block 416, the processor 202 combines the data. That is, the processor 202 may combine the linked child incidents and the sampled reference incidents to generate a data set (e.g., an "iteration data set") to be used for this iteration. In process block 418, the processor 202 preprocesses the data. That is, the processor 202 may determine or identify the features in each incident of the iteration data set. As illustrated, the preprocessed data may be used in the decision tree portion 282, which is discussed in FIG. 7 above.

In process block 420, the processor 202 trains a logistic regression model based on the features of an incident. The logistic regression model may use predictive analysis to describe the relationship between the features of an incident and the problem. In particular, because the processor 202 knows which incidents of the iteration data set are related to the problem (e.g., the linked child incidents) and which incidents of the iteration data set are not (e.g., the reference incidents), the logistic regression model may use each feature of an incident and generate an expression or equation that relates the features of linked child incidents to the problem, such as an expression or equation that represents a likelihood that an incident is related to the problem based on the feature being part of the incident.

In some embodiments, a first portion of the iteration data set may be used to train the logistic regression model, while a second, remaining portion of the data set may be used to later test the accuracy of the trained logistic regression model. For example, 40-95%, 50-80%, 65-75% or any other suitable portion (e.g., 70%) of the iteration data set may be used to train the logistic regression model, while the remainder of the iteration data set (60-5%, 50-30%, 35-25%, or any other suitable remaining portion (e.g., 30%), respectively) may be used to verify the accuracy of the trained logistic regression model.

In decision block 422, the processor 202 determines whether the accuracy of the trained logistic regression model is greater than or equal to a threshold accuracy level. In particular, the processor 202 may apply the trained logistic regression model to the remaining portion of the iteration data set that was not used to train the logistic regression model. Because the processor 202 knows which incidents of the iteration data set are related to the problem (e.g., the linked child incidents) and which incidents of the iteration data set are not (e.g., the reference incidents), the processor 202 may determine that the trained logistic regression model is accurate when it correctly identifies linked child incidents of the remaining portion of the iteration data set as related to the problem, and when it correctly identifies reference incidents of the remaining portion of the iteration data set as unrelated to the problem. The threshold accuracy level may be any suitable accuracy level that indicates that the trained logistic regression model is sufficiently accurate. For example, the threshold accuracy level may be between 50-100%, 60-90%, 70-80%, or any other suitable accuracy level, such as 70%.

If the processor 202 determines that the accuracy of the trained logistic regression model is greater than or equal to the threshold accuracy level, then the trained logistic regression model may be used in an odds ratio calculation portion 272, which is discussed in FIG. 5 above. Additionally, the processor 202, in process block 424, stores the trained logistic regression model. For example, the processor 202 may store the trained logistic regression model in the memory 206.

In decision block 426, the processor 202 determines whether the counter is less than or equal to the number of iterations N. If so, the processor 202, in process block 428, increments the counter, and then proceeds to process block 414 to sample the reference data (e.g., the reference incidents) again to generate a new sample of reference data to generate and train a new logistic regression model.

If the processor 202 determines that the counter is greater than the number of iterations N (in decision block 426), then the number of iterations N has been performed. The processor 202 then, in process block 430, retrieves or loads the trained logistic regression models of all performed iterations N that were stored in process block 424.

In process block 432, the processor 202 receives a new incident or a new batch of incidents. In particular, the new one or more incidents may be input in order to receive a prediction of whether the new one or more incidents are related to the selected problem (from process block 412). In some embodiments, a user or system administrator may select the new one or more incidents. While more than one new incident may be received in process block 432, for the remainder of the present disclosure, a single new incident will be discussed for reasons of clarity. However, it should be understood that discussion of the one single new incident in the remainder of the present disclosure may also apply to multiple new incidents received in process block 432.

In process block 434, the processor 202 uses the retrieved trained logistic regression models of all performed iterations N to predict whether the new incident is related to the selected problem. In particular, the processor 202 may apply each retrieved trained logistic regression model to the new incident, and each retrieved trained logistic regression model may provide a prediction (e.g., Yes or No) as to whether the new incident is related to the selected problem.

In process block 436, the processor 202 evaluates the predictions made by the retrieved trained logistic regression models. In particular, the processor 202 may generate a single prediction or evaluation based on the predictions made by the retrieved trained logistic regression models. The processor 202 may then return the single prediction or evaluation. In some embodiments, if more than a threshold number or percentage of the trained logistic regression models predict that the incident is related to the problem, then the processor 202 may return that the incident is related to the problem. For example, the threshold percentage may be 10-100%, 25-90%, 50-75%, or any suitable percentage, such as 50%. That is, if a majority (e.g., greater than 50% or 50% or greater) of the trained logistic regression models predict that the incident is related to the problem, then the processor 202 may return that the incident is related to the problem.

In process block 438, the processor 202 terminates the process 340. Similarly, from decision block 422, if the processor 202 determines that the accuracy of a trained logistic regression model is less than the threshold accuracy level, then the processor 202 also terminates the process 340. In some embodiments, if the processor 202 determines that the accuracy of the decision tree is less than the threshold accuracy level, then the processor 202 may advance to process block 428 to increment the counter and begin another iteration.

Figure 10:
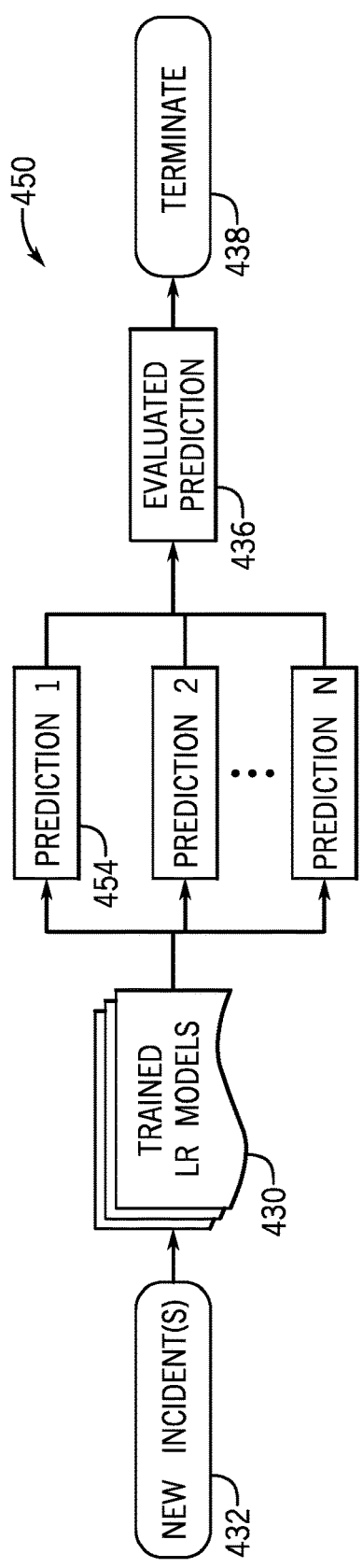
FIG. 10 is a flow diagram of a process for evaluating the predictions made by the retrieved trained logistic regression models, according to embodiments of the present disclosure.

FIG. 10 is a flow diagram of a process 450 for evaluating the predictions made by the retrieved trained logistic regression models, according to embodiments of the present disclosure. In some embodiments, the process 450 may be implemented in the form of a software application that includes instructions executable by at least one suitable processor of the cloud computing system 10, such as a processor of the MID server 24 or the client instance 102. In some embodiments, the management server 24 or the client instance 102 may be implemented as the computing system 200 of FIG. 3, and, as such, the process 450 may be implemented by the processor 202. The illustrated process 450 is merely provided as an example, and in other embodiments, certain illustrated steps of the process 450 may be performed in other orders, skipped, or repeated, in accordance with the present disclosure.

In particular, FIG. 10 illustrates the new incident from process block 432 of FIG. 9, as well as the trained logistic regression models that were retrieved from process block 430. As illustrated, the processor 202 applies each retrieved trained logistic regression model to the new incident to generate a respective prediction 454 (e.g., Yes or No) as to whether the new incident is related to the selected problem. The processor 202 then evaluates the predictions 454 to generate a single prediction or evaluation 456. In process block 438, the processor 202 terminates the process 450.

In this manner, the processor 202 may perform the process 410 and/or the process 450 to predict whether a new incident is related to a problem. In particular, the processor 202 may generate and train multiple logistic regression models using linked child incidents and reference incidents, and evaluate predictions made by applying the multiple logistic regression models to the new incident to predict whether the new incident is related to the problem. The processor 202 may then report the prediction (e.g., by electronic mail or display on a user interface) to a user or system administrator. The user or system administrator may thus be made aware of whether the processor 202 predicts that the new incident is related to the problem.

Figure 11:
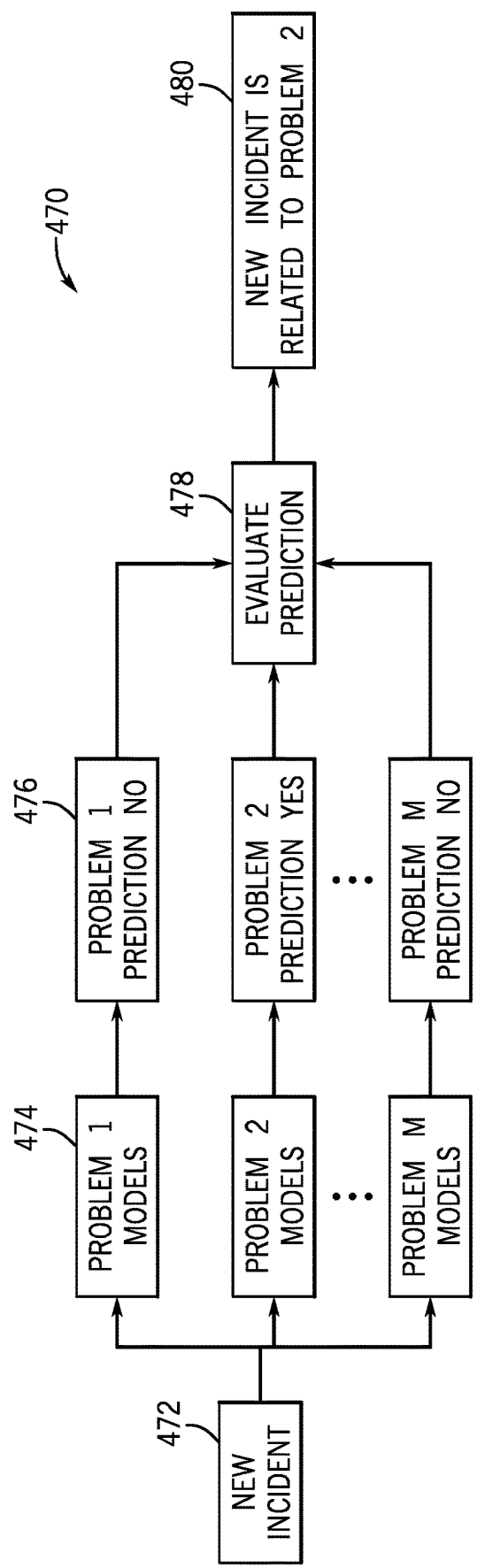
FIG. 11 is a flow diagram of a process that predicts which problem among multiple problems a new incident is related to, according to embodiments of the present disclosure.

Additionally, the processor 202 may perform the process 410 and/or the process 450 to predict which problem among multiple problems a new incident is related to. FIG. 11 is a flow diagram of a process 470 that predicts which problem among multiple problems a new incident is related to, according to embodiments of the present disclosure. In some embodiments, the process 470 may be implemented in the form of a software application that includes instructions executable by at least one suitable processor of the cloud computing system 10, such as a processor of the MID server 24 or the client instance 102. In some embodiments, the management server 24 or the client instance 102 may be implemented as the computing system 200 of FIG. 3, and, as such, the process 470 may be implemented by the processor 202. The illustrated process 470 is merely provided as an example, and in other embodiments, certain illustrated steps of the process 470 may be performed in other orders, skipped, or repeated, in accordance with the present disclosure.

As illustrated, in process block 472, the processor 202 receives a new incident (or one or more new incidents). In particular, the new incident may be input in order to receive a prediction of which problem among multiple problems the new incident is related to. In some embodiments, a user or system administrator may select the new incident.

In process blocks 474, the processor 202 applies logic regression models corresponding to each problem of the multiple problems to the new incident. In particular, a set of logic regression models may be generated and trained for each problem of the multiple problems following the process 410 shown in FIG. 9. That is, for each problem of the multiple problems (e.g., 1-M problems), a respective problem may be selected in process block 412 of FIG. 9, and a respective set of logic regression models (e.g., Problem 1 Models-Problem M Models) may be generated and trained in process block 420. The processor 202 may apply each set of logic regression models to the new incident.

In process block 476, the processor 202 generates the predictions received from applying the logic regression models to the new incident. That is, each set of logic regression models (e.g., Problem 1 Models-Problem M Models) may generate a respective prediction (e.g., Problem 1 Prediction-Problem M Prediction). As illustrated, the Problem 1 Prediction is that the new incident is not related to Problem 1 ("No"), the Problem 2 Prediction is that the new incident is related to Problem 2 ("Yes"), and the Problem M Prediction is that the new incident is not related to Problem M ("No").

In process block 478, the processor 202 evaluates the predictions. The processor 202 may generate a single prediction or evaluation based on the predictions made by the sets of logic regression models. Because the Problem 1 and Problem M Predictions indicate that the new incident is not related to Problem 1 or Problem M, but the Problem 2 Prediction indicates that the new incident is related to Problem 2, the processor 202 may predict that the new incident is related to Problem 2. In some embodiments, the processor 202 may evaluate the predictions to generate respective likelihoods that the new incident is related to each problem based on the predictions received from applying the logic regression models to the new incident. For example, if Problem 1 and Problem 2 both indicate that the new incident is related to Problem 1 and Problem 2, but the Problem M Prediction indicates that the new incident is not related to Problem M, the processor 202 may predict that the new incident has a 50% likelihood that it is related to Problem 1, and a 50% likelihood that it is related to Problem 2.

In process block 480, the processor 202 then outputs the evaluated prediction. As illustrated, the processor 202 indicates that the new incident is related to Problem 2. In this manner, the process 470, combined with at least part of the process 450 of FIG. 9, enables the processor 202 to predict which problem among multiple problems a new incident is related to. The processor 202 may then report the prediction (e.g., by electronic mail or display on a user interface) to a user or system administrator. The user or system administrator may thus be made aware of which problem the processor 202 predicts that the new incident is related to.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A cloud computing system comprising:
   one or more data centers;
   a client instance hosted by the one or more data centers, wherein the client instance is accessible by one or more remote client networks, wherein the cloud computing system is configured to:
      receive a selection of a problem of the cloud computing system and a set of incidents reported based on using the cloud computing system, wherein the set of incidents comprises a set of related incidents that are related to the problem and a set of unrelated incidents that are unrelated to the problem;
      train a set of logistic regression models based on one or more features of the set of incidents;
      determine one or more odds ratios of the one or more features based on the set of logistic regression models, wherein each odds ratio corresponds to a feature of the one or more features and represents a likelihood of an incident from the set of incidents being related to the problem based on the feature; and
      report the one or more odds ratios.

2. The cloud computing system of claim 1, wherein the problem comprises an elevated level incident that has been reported multiple times.

3. The cloud computing system of claim 1, wherein the set of incidents are reported during a specified time range.

4. The cloud computing system of claim 1, wherein the cloud computing system is configured to:
   sample the set of unrelated incidents to generate a subset of unrelated incidents that are unrelated to the problem; and
   train each logistic regression model of the set of logistic regression models with the set of related incidents and the subset of unrelated incidents.

5. The cloud computing system of claim 4, wherein the cloud computing system is configured to train each logistic regression model of the set of logistic regression models with a different subset of unrelated incidents.

6. The cloud computing system of claim 4, wherein the cloud computing system is configured to determine each odds ratio by dividing a first ratio by a second ratio;
   wherein the first ratio comprises:
      a first numerator of a number of related incidents of the set of related incidents having the feature; and
      a first denominator of a number of related incidents of the set of related incidents not having the feature; and
   wherein the second ratio comprises:
      a second numerator of a number of unrelated incidents of the set of unrelated incidents having the feature; and
      a second denominator of a number of unrelated incidents of the set of unrelated incidents not having the feature.

7. The cloud computing system of claim 1, wherein each logistic regression model of the set of logistic regression models is configured to describe a relationship between the one or more features of the set of incidents and the problem.

8. The cloud computing system of claim 1, wherein each feature of the one or more features comprises a numerical features, a categorical feature, a text feature, or a time-related feature.

9. A tangible, non-transitory, machine-readable-medium, comprising machine-readable instructions that, when executed by a processor, cause the processor to perform acts comprising:

receiving a selection of a problem and a set of incidents, wherein the set of incidents comprises a set of related incidents that are related to the problem and a set of unrelated incidents that are unrelated to the problem;

displaying a user interface visualizing the problem, the set of related incidents that are related to the problem, and one or more features of the set of related incidents;

generating a set of decision trees that split based on a plurality of splitting criteria, wherein the plurality of splitting criteria is based on whether a feature of a plurality of features is present in the set of incidents, and wherein the plurality of features comprises the one or more features of the set of related incidents;

extracting the plurality of splitting criteria from the set of decision trees; and reporting the plurality of splitting criteria.

10. The tangible, non-transitory, machine-readable-medium of claim 9, wherein the instructions, when executed by the processor, cause the processor to perform acts comprising splitting each decision tree of the set of decision trees based on a splitting criteria of the plurality of splitting criteria.

11. The tangible, non-transitory, machine-readable-medium of claim 9, wherein the instructions, when executed by the processor, cause the processor to perform acts comprising determining the plurality of splitting criteria based on impurity of nodes of the decision tree, number of incidents of the nodes of the decision tree, distribution of the nodes of the decision tree, or any combination thereof.

12. The tangible, non-transitory, machine-readable-medium of claim 9, wherein the instructions, when executed by the processor, cause the processor to perform acts comprising:

sampling the set of unrelated incidents to generate a subset of unrelated incidents that are unrelated to the problem; and generating the set of decision trees with the set of related incidents and the subset of unrelated incidents.

13. The tangible, non-transitory, machine-readable-medium of claim 12, wherein the subset of unrelated incidents comprises a different subset of unrelated incidents for each decision tree of the set of decision trees.

14. A method for predicting whether a new incident is related to a problem, comprising:

receiving a selection of the problem and a set of incidents, wherein the set of incidents comprises a set of related incidents that are related to the problem and a set of unrelated incidents that are unrelated to the problem;

training a set of logistic regression models to predict whether the new incident is related to the problem based on the set of incidents by identifying the set of related incidents that are related to the problem and the set of unrelated incidents that are unrelated to the problem;

receiving the new incident;

generating a prediction as to whether the new incident is related to the problem by applying the set of logistic regression models to the new incident; and reporting the prediction.

15. The method of claim 14, comprising:

sampling the set of unrelated incidents to generate a subset of unrelated incidents that are unrelated to the problem; and training the set of logistic regression models with the set of related incidents and the subset of unrelated incidents.

16. The method of claim 15, wherein training the set of logistic regression models comprises training each logistic regression model with a different subset of unrelated incidents.

17. The method of claim 14, wherein the new incident is predicted to be related to the problem when a majority of logistic regression models of the set of logistic regression models predict that the new incident is related to the problem.

18. The method of claim 14, comprising training a plurality of sets of logistic regression models corresponding to a plurality of problems, wherein the plurality of sets of logistic regression models comprises the set of logistic regression models, wherein the plurality of problems comprises the problem.

19. The method of claim 18, comprising predicting which problem of the plurality of problems the new incident is related to by applying each set of logistic regression models of the plurality of sets of logistic regression models to the new incident.

20. The method of claim 18, wherein each set of logistic regression models of the plurality of sets of logistic regression models is used to make a respective prediction as to whether the new incident is related to a respective problem of the plurality of problems.

* * * * *